(12) United States Patent
Schmidt et al.

(10) Patent No.: US 12,290,022 B2
(45) Date of Patent: May 6, 2025

(54) TRIMMER LINE SPOOL FOR A TRIMMER HEAD

(71) Applicant: Andreas Stihl AG & Co. KG, Waiblingen (DE)

(72) Inventors: Sebastian Schmidt, Kirchheim a. N. (DE); Simon Haug, Waiblingen (DE); Sebastian Zappe, Kirchberg an der Murr (DE); Christoph Brenner, Gärtringen (DE); Achim Rethaber, Fellbach (DE); Björn Petersen, Großbottwar (DE); Stefan Buchner, Nesselwang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 179 days.

(21) Appl. No.: 17/106,223

(22) Filed: Nov. 30, 2020

(65) Prior Publication Data

US 2021/0168997 A1 Jun. 10, 2021

(30) Foreign Application Priority Data

Dec. 4, 2019 (EP) ..................................... 19213583

(51) Int. Cl.
*A01D 34/416* (2006.01)

(52) U.S. Cl.
CPC ..... *A01D 34/4166* (2013.01); *A01D 34/4163* (2013.01); *A01D 34/4165* (2013.01); *A01D 34/4168* (2013.01)

(58) Field of Classification Search
CPC ............ A01D 34/4168; A01D 34/4165; A01D 34/4163; A01D 34/4166
See application file for complete search history.

(56) References Cited

U.S. PATENT DOCUMENTS

| 4,271,595 A | * | 6/1981 | Rahe | A01D 34/416 56/12.7 |
| 5,615,543 A | * | 4/1997 | Caffey | A01D 34/4166 56/DIG. 17 |
| 5,765,287 A | | 6/1998 | Griffini et al. | |

(Continued)

FOREIGN PATENT DOCUMENTS

| CN | 105 830 622 | 8/2016 |
| EP | 0 970 596 | 1/2000 |

(Continued)

*Primary Examiner* — Liang Dong
(74) *Attorney, Agent, or Firm* — Gudrun E. Huckett

(57) ABSTRACT

A trimmer line spool has first and second spool chambers for a trimmer line. First and second holder pairs are provided. The first holder pair has first and second trimmer line holders associated with the first spool chamber and the second spool chamber, respectively. The second holder pair has first and second trimmer line holders associated with the first spool chamber and the second spool chamber, respectively. The trimmer line holders of the first holder pair each have a first opening for the trimmer line. The trimmer line holders of the second holder pair each have a second opening for the trimmer line. A diameter of the first openings is larger than a diameter of the second openings. The first openings are positioned at an angle of 150° to 210° to each other. The second openings are positioned at an angle of 150° to 210° to each other.

15 Claims, 6 Drawing Sheets

(56) References Cited

U.S. PATENT DOCUMENTS

| | | | |
|---|---|---|---|
| 5,806,192 A * | 9/1998 | Everts | A01D 34/4163 30/276 |
| 6,263,580 B1 * | 7/2001 | Stark | A01D 34/4163 30/276 |
| 6,952,877 B2 | 10/2005 | Pfaltzgraff | |
| 8,910,388 B2 | 12/2014 | Proulx | |
| 2002/0073556 A1 * | 6/2002 | Fogle | A01D 34/416 30/276 |
| 2008/0047148 A1 | 2/2008 | Proulx | |
| 2011/0000091 A1 | 1/2011 | Proulx | |
| 2012/0272535 A1 * | 11/2012 | Arnetoli | A01D 34/4161 30/347 |
| 2013/0205596 A1 | 8/2013 | Pellenc | |
| 2015/0121707 A1 * | 5/2015 | Li | A01D 34/4161 30/276 |
| 2017/0042086 A1 | 2/2017 | Rethaber | |
| 2018/0020614 A1 * | 1/2018 | Alliss | A01D 34/4163 30/276 |
| 2019/0124833 A1 | 5/2019 | Yamazaki | |

FOREIGN PATENT DOCUMENTS

| | | |
|---|---|---|
| KR | 20100119313 | 11/2010 |
| WO | 97/29627 | 8/1997 |

* cited by examiner

TRIMMER LINE SPOOL FOR A TRIMMER HEAD

BACKGROUND OF THE INVENTION

The invention relates to a trimmer line spool for a trimmer head.

A trimmer serves for mowing grass, shrub or the like. For this purpose, a trimmer head with a tool is driven in rotation about an axis of rotation of the trimmer head so that the grass is cut off upon contact with the tool. As a tool, in particular trimmer lines are used which are subject to a certain wear in operation of the trimmer line. In order to be able to feed the trimmer line for adjustment, the trimmer line can be unwound from a trimmer line spool of the trimmer head so that mowing with the trimmer head can be continued without impairment of the cutting function without having to perform a complete exchange of the trimmer line.

Trimmer heads are known whose trimmer line spool comprises two spool chambers for winding a trimmer line therein, respectively. Each spool chamber is provided with two trimmer line holders that enable clamping of trimmer lines of different thickness. A disadvantage of such trimmer heads is that in operation of such a trimmer head extremely high loads are occurring.

It is an object of the invention to further develop a trimmer line spool in such a way that the loads which are acting on the trimmer line spool in operation of the trimmer head can be reduced and at the same time an ergonomic handling of the trimmer line spool is enabled for the operator.

SUMMARY OF THE INVENTION

In accordance with the invention, this object is solved in that the trimmer line spool for a trimmer head comprises an axis of rotation and a first spool chamber and a second spool chamber for winding a trimmer line therein, respectively, wherein the trimmer line spool comprises at least two holder pairs, wherein the first holder pair of the at least two holder pairs and the second holder pair of the at least two holder pairs each comprise a first trimmer line holder correlated with the first spool chamber and a second trimmer line holder correlated with the second spool chamber, wherein each trimmer line holder comprises an opening for receiving a trimmer line end, wherein the diameter of the openings of the trimmer line holders of the first holder pair is greater than the diameter of the openings of the trimmer line holder of the second holder pair, wherein the openings of the trimmer line holders of a respective holder pair are positioned relative to each other at an angle distance of 150° to 210°, measured around the axis of rotation.

The object is further solved in that the trimmer line spool for a trimmer head comprises an axis of rotation and at least one spool chamber for winding a trimmer line therein, wherein the trimmer line spool comprises a first spool wall for delimiting the at least one spool chamber in the direction of the axis of rotation and an actuating device that adjoins in the direction of the axis of rotation the first spool wall and is arranged outside of the spool chamber, wherein the actuating device comprises a holding projection extending in radial direction relative to the axis of rotation for partial engagement from behind by an operator, wherein in the first spool wall at least one grip depression is arranged opposite to the holding projection.

The trimmer line spool according to the invention is based on the recognition that the high loads acting on the trimmer head when the trimmer head is operating result from imbalance of the trimmer line spool. This imbalance can be traced back mostly to the arrangement of the trimmer lines in the spool chambers wherein the arrangement of the trimmer lines results, in turn, from the position of the trimmer line holders. In order to reduce the imbalance at the trimmer line spool, the trimmer lines are to be arranged such that the centrifugal forces acting on the trimmer line spool cancel each other or are in mutual force balance.

The trimmer line spool according to the invention comprises at least two holder pairs. The first holder pair of the at least two holder pairs and the second holder pair of the at least two holder pairs comprise each a first trimmer line holder correlated with the first spool chamber and a second trimmer line holder correlated with the second spool chamber. Each trimmer line holder comprises an opening for receiving a trimmer line end. The diameter of the openings of the trimmer line holders of the first holder pair is larger than the diameter of the opening of the trimmer line holders of the second holder pair. The openings of the trimmer line holders of a respective holder pair comprise an angle distance of 150° to 210°, measured about the axis of rotation.

For operating the trimmer head, the trimmer lines are wound onto the trimmer line spool. For this purpose, a respective trimmer line is inserted into the opening of a trimmer line holder of a holder pair and wound onto the circumference of the trimmer line spool in the respective spool chamber. In operation of the trimmer head, centrifugal forces are acting on the trimmer line holders as well as on the trimmer lines. Since the openings of the trimmer line holders of a holder pair as well as of the trimmer line ends clamped therein are displaced relative to each other about the axis of rotation, the centrifugal forces which are acting on the trimmer lines substantially cancel each other. The imbalance of the trimmer line spool as well as the loads acting on the trimmer head are reduced. Moreover, it has been found that threading the trimmer lines into trimmer line holders that are displaced relative to each other is much easier for the operator. Due to their differently sized openings, the holder pairs assist the operator in regard to which holder pair is to be used for a corresponding trimmer line or into which trimmer line holder a corresponding trimmer line is to be threaded.

The trimmer line holders of at least one holder pair are positioned preferably at least partially in a longitudinal plane containing the axis of rotation. Preferably, the trimmer line holders of a holder, when viewed in the direction of the axis of rotation, are arranged relative to each other with rotational symmetry in relation to the axis of rotation. Due to this symmetrical arrangement of the trimmer line holders, a balanced mass distribution of the trimmer line spool, in particular with wound-on trimmer lines, is enabled, and imbalances are avoided when the trimmer line spool is rotated.

It is advantageously provided that the trimmer line holders of a holder pair are formed of identical trimmer line chambers. The trimmer line can be inserted preferably only through the opening of the trimmer line holder into the trimmer line chamber. As a result, the trimmer line can be inserted only at one side of the trimmer line holders so that a faulty winding direction of the trimmer line onto the trimmer line spool is prevented. The trimmer line chamber is preferably closed at the side which is opposite the opening and forms a stop for the trimmer line end. The trimmer line, when threaded into the trimmer line chamber, is preferably pushed up to the stop. In this way, the trimmer line ends of both trimmer lines are respectively contacting the stops of the trimmer line chambers of a holder pair so that a symmetric arrangement of the trimmer lines can be ensured.

The trimmer line spool comprises a rotational direction wherein the opening is preferably formed at the leading side of the trimmer line chamber viewed in the rotational direction. The rotational direction corresponds to the rotational direction of the trimmer line spool in operation of a trimmer head.

It is advantageously provided that the diameter of the openings of the trimmer line holders of the second holder pair amounts to at most 90% of the diameter of the openings of the trimmer line holders of the first holder pair. Due to the openings of the trimmer line holders having different sizes, trimmer lines with differently sized diameters can be secured in the trimmer line holders. In this way, as a function of the intended use, a corresponding trimmer line with a diameter that is suitable for this intended use can be provided.

It is advantageously provided that the trimmer line spool comprises a first spool wall, a second spool wall, and an intermediate wall which is arranged between the first spool wall and the second spool wall. The first spool wall, the second spool wall, and the intermediate wall are preferably connected to each other by a circumferential wall extending in the direction of the axis of rotation. The trimmer line holders are preferably contacting the intermediate wall in the direction of the axis of rotation. By arranging the trimmer line holders at the intermediate wall, the mass forces which are generated in operation of the trimmer head at the trimmer line spool are reduced. The first trimmer line holder of one holder pair and the second trimmer line holder of the other holder pair are preferably arranged mirror-symmetrically relative to each other in relation to the intermediate wall. This arrangement contributes also to a balanced mass distribution of the trimmer line spool.

The trimmer line spool preferably comprises a contour structure for an indexing device at an end face thereof. In operation of the trimmer head, the trimmer line spool is connected to the housing of the trimmer head with form fit in the rotational direction by means of the contour structure. Upon actuation of the indexing device, the form fit between the housing of the trimmer head and the trimmer line spool is canceled. The trimmer line spool can then be rotated relative to the housing in an unwinding direction, whereby the trimmer line is unwound from the trimmer line spool. The unwinding process is realized in the installed state of the trimmer line spool. Demounting the trimmer head is not required.

The trimmer line spool comprises preferably at least one continuous trimmer line channel through which the trimmer line can be pushed and wound. Such a continuous channel enables the operator to wind the trimmer line in the mounted state of the trimmer head. Accordingly, the operator inserts the trimmer line into the trimmer line channel and the trimmer line spool is subsequently rotated relative to the trimmer head. The free ends of the trimmer line then wind respectively into one of the two spool chambers. The trimmer line channel comprises preferably an inlet opening and an outlet opening, wherein the inlet opening and the outlet opening are preferably arranged centrally between two trimmer line holders of a holder pair in circumferential direction. The inlet opening and the outlet opening of the trimmer line channel are arranged preferably in the intermediate wall. This favors a balanced mass distribution of the trimmer line spool for avoiding imbalances.

As a further independent invention, it is provided that the trimmer line spool comprises an actuating device that adjoins the first spool wall in the direction of the axis of rotation and is arranged outside of the spool chamber. The actuating device comprises a holding projection extending in radial direction relative to the axis of rotation and configured to be partially engaged from behind by an operator. In the first spool wall, at least one grip depression is formed that is positioned opposite the holding projection.

The actuating device serves for actuating the indexing device of the trimmer head. For this purpose, the trimmer line spool is to be pulled against a spring force in the direction of the axis of rotation, whereby the form-fit connection between the housing and the trimmer line spool is canceled, and is subsequently to be rotated relative to the housing in an unwinding direction. In this context, the trimmer line spool is gripped at its actuating device by the operator and is pulled in the direction away from the housing. This is done in that the operator engages from behind the holding projection of the actuating device. Due to the at least one grip depression which is formed opposite the holding projection in the first spool wall, the operator has more room to engage the holding projection from behind. Thus, the grip depression enables the operator to have better grip on the actuating device.

The trimmer line spool comprises preferably an intermediate wall and at least one continuous trimmer line channel that extends at least partially in the intermediate wall and through which the trimmer line can be passed preferably completely through the trimmer line spool and wound. The trimmer line channel comprises preferably an inlet opening and an outlet opening. The inlet opening and the outlet opening comprise in particular an angle distance of 150° to 210° relative to each other that is measured around the axis of rotation. The at least one grip depression is preferably arranged in a circumferential region that is positioned between the inlet opening and the outlet opening. Preferably, several grip depressions, in particular two grip depressions are arranged in a circumferential region.

The inlet opening and the outlet opening of the trimmer line channel at the intermediate wall cause a locally thickened portion of the intermediate wall. The spool chambers each comprises a height measured in the direction of the axis of rotation. The height of the spool chambers is reduced at the locally thickened portion of the intermediate wall. In order to not additionally reduce the height of the spool chambers and thus reduce the space which is available for winding on the trimmer line, the at least one grip depression, in particular two grip depressions, are arranged in the circumferential region. In this way, between the thickened portion at the intermediate wall and the first spool wall there is sufficient space provided for winding the trimmer line. No additional constriction of the spool chamber is produced at the inlet opening and at the outlet opening of the intermediate wall so that still an easy winding of the trimmer line is ensured.

BRIEF DESCRIPTION OF THE DRAWING

Further features of the invention result from the description and the drawing in which embodiments of the invention described in detail in the following are represented.

DESCRIPTION OF PREFERRED EMBODIMENTS

Figure 1:
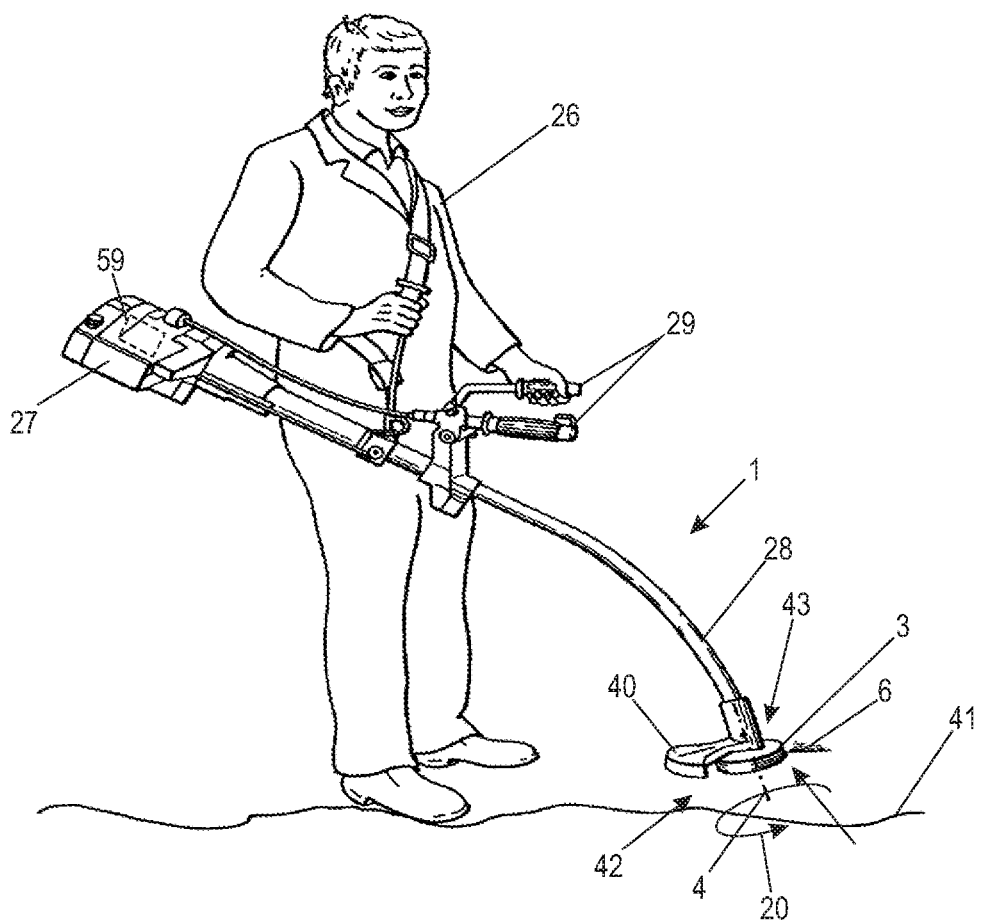
FIG. 1 is a schematic illustration of a trimmer held by an operator.

FIG. 1 shows a trimmer 1 in a schematic illustration. The trimmer 1 is held by an operator 26. The trimmer 1 comprises a rearward end with a rearward housing 27 and a front end from which a drive shaft 2 (FIG. 2) projects. A shaft 28 connects the rearward end and the front end. Handles 29 for guiding the trimmer 1 are arranged at the shaft 28. A trimmer head 3 adjoins the front end of the trimmer 1. The trimmer head 3 is fastened to the drive shaft 2 and is driven in rotation about an axis of rotation 4 by a drive motor 59, only schematically indicated, in a rotational direction 20. The drive motor 59 is arranged in the rearward housing 27 wherein a drive shaft is extending in the shaft 28. It can be provided that this drive shaft is connected inside the shaft 28 immediately to the drive shaft 2 for the trimmer head 3 so that no gearbox is positioned inbetween. In an alternative embodiment, not illustrated, the drive motor 59 which is in particular an electric motor, can also be arranged at a front housing, not illustrated, that is arranged at the front end. Advantageously, in the front housing there is also the gear box. The trimmer head 3 at the side which in operation is facing the operator 26 is provided with a protective shield 40. The trimmer head 3 comprises at least one tool which—a trimmer line 6, 6' in the embodiment—serves for cutting things such as grass, shrubs or the like. A bottom side 42 is formed at the trimmer head 3 and faces the ground 41 in operation; it is arranged at the side of the trimmer head 3 facing away from the shaft 28. At the side of the trimmer head 3 which is facing the shaft 28, a top side 43 of the trimmer head 3 is formed. Protective gear that has to be worn mandatorily by the operator 26 for operating the trimmer 1 is not illustrated in the simplified illustration of FIG. 1.

Figure 2:
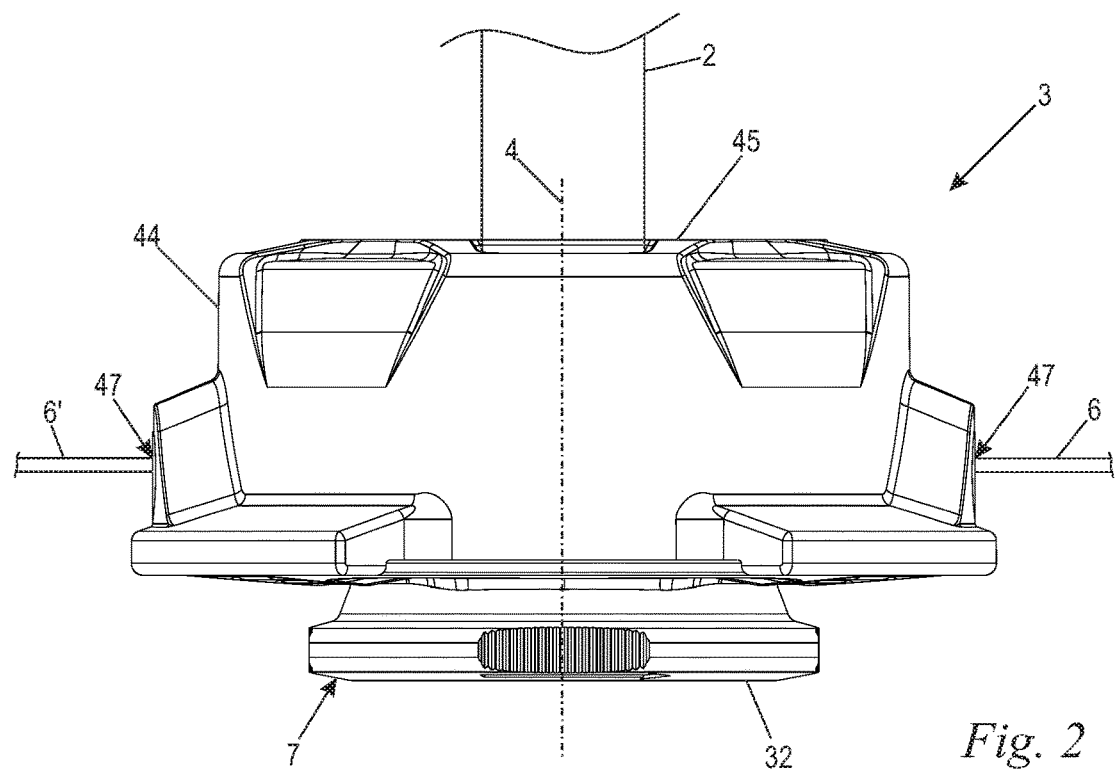
FIG. 2 is a side view of an embodiment of a trimmer head.

In FIG. 2, the trimmer head 3 is shown in a side view. The trimmer head 3 comprises an axis of rotation 4 about which the trimmer head 3 is rotated in operation of the trimmer. For this purpose, the trimmer head 3 is driven by the drive shaft 2 which is only schematically illustrated. In addition, the trimmer head 3 comprises a housing 44 and a trimmer line spool 7 arranged at the housing. The housing 44 of the trimmer head 3 is cup-shaped and comprises in the embodiment a cover 45 and a circumferential wall 46. The cover 45 extends, beginning at the axis of rotation 4, in radial direction away from the axis of rotation 4. The cover 45 is in particular oriented perpendicularly to the axis of rotation 4 of the trimmer head 3. The circumferential wall 46 adjoins the cover 45 and extends in the direction of the axis of rotation 4.

Figure 3:
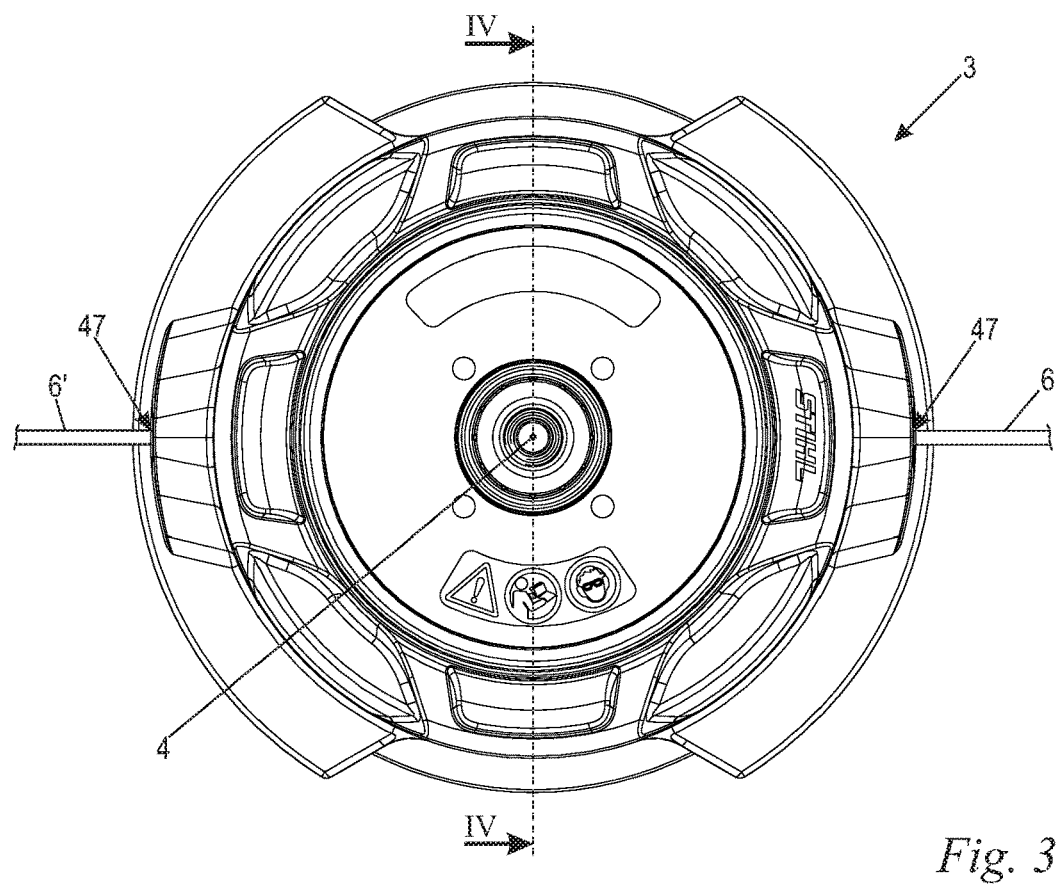
FIG. 3 is plan view of a trimmer head according to FIG. 2.

As illustrated in FIGS. 2 and 3, trimmer lines 6, 6' can be attached to the trimmer head 3. In the preferred embodiment, up to two trimmer lines 6, 6', i.e., a first trimmer line 6 and a second trimmer line 6', can be attached. The trimmer lines 6, 6' project from the housing 44 of the trimmer head 3. For this purpose, two trimmer line openings 47 are provided at the circumferential wall 46 of the housing 44 in the preferred embodiment; the trimmer line openings 47 are oppositely positioned in relation to the axis of rotation 4, and the trimmer lines 6, 6' project from the housing 44 through the trimmer line openings 47. In an alternative embodiment of the trimmer head 3, it can be expedient to provide a different number of trimmer line openings 47 and a different number of trimmer lines 6, 6'.

Figure 4:
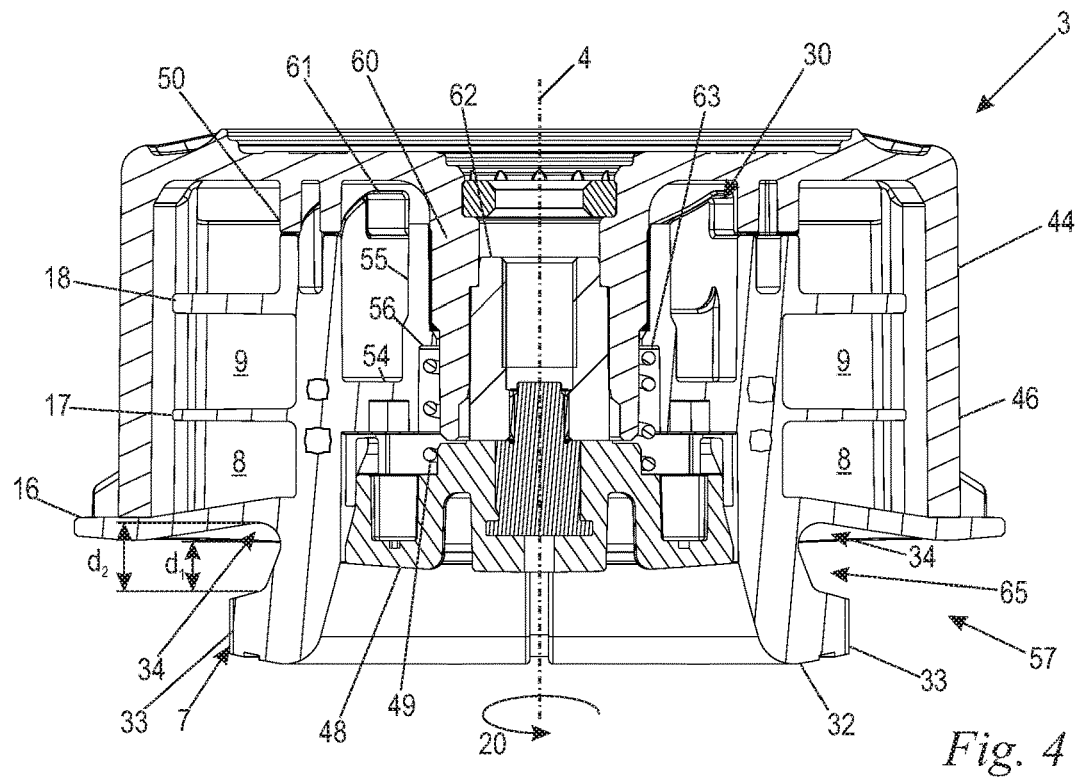
FIG. 4 is a section illustration of the trimmer head in the direction of arrows IV according to FIG. 3.

As illustrated in FIG. 4, a hollow pin 60 is projecting coaxial to the axis of rotation 4 away from the cover 45 of the housing 44. The pin 60 is formed at an inner side 61 of the cover 45 facing the trimmer line spool 7. At the circumferential side of the pin 60, the trimmer line spool 7 is arranged. The trimmer line spool 7 is supported on the pin 60 of the housing 44 so as to be rotatable and displaceable in the direction of the axis of rotation 4, i.e., axially. The trimmer line spool 7 is detachably secured by means of a fastening element 48 on the pin 60 of the housing 44. The fastening element 48 is embodied as a screw element and is screw-connected to an intermediate element 62 that is fixedly connected to the pin 60. Between the trimmer line spool 7 and the fastening element 48, a spring element 49 is arranged which in the embodiment is embodied as a coil spring. The spring element 49 is contacting with one end an inner side of the fastening element 48 facing the trimmer line spool 7. The spring element 49 is contacting with its other end a stop contour structure 63 of the trimmer line spool 7. In this context, the spring element 49 exerts a spring force onto the trimmer line spool 7 wherein the spring force acts in the direction of the axis of rotation 4 toward the cover 45. In an operating position 57 of the trimmer head 3, the trimmer line spool 7 is tensioned by the spring element 49 against the housing 44 in the direction of the axis of rotation 4.

Figure 9:
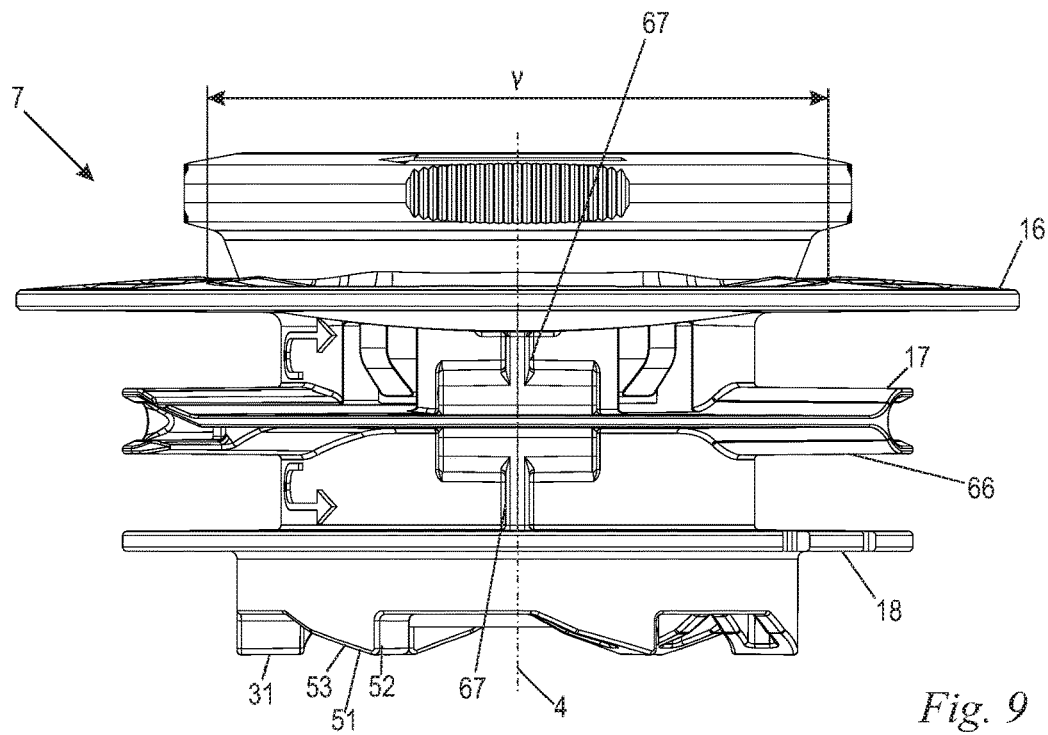
FIG. 9 is a side view of the trimmer line spool in a position rotated about 90° about the axis of rotation relative to FIG. 6.

As shown in FIG. 4, the trimmer head 3 comprises an indexing device 30 which enables winding and unwinding of the trimmer line 6, 6' from the trimmer line spool 7 in the mounted state of the trimmer head 3. The indexing device 30 is formed by a contour structure 31 of the trimmer line spool 7 and a counter contour structure 50 of the housing 44 of the trimmer head 3 interacting with the contour structure 31. The contour structure 31 is formed at the end face 64 of the trimmer line spool 7 facing the cover 45 of the housing 44. The counter contour structure 50 is provided at the inner side 61 of the cover 45 of the housing 44. The contour structure 31 is comprised of a plurality of ramps 51 which are arranged in circumferential direction. The ramps 51 comprise an engagement surface 52 which, relative to the rotational direction 20, is positioned at the trailing end of the ramp 51 and is oriented parallel to the axis of rotation 4. The ramp 51 comprises in addition a back surface 53 which adjoins the engagement surface 52 and is oriented at a slant to the engagement surface 52 (FIG. 9). In the operating position 57, the counter contour structure 50 of the housing 44 and the contour structure 31 of the trimmer line spool 7 provide a form fit connection in the rotational direction 20. In this way, the trimmer line spool 7 is connected to the housing 44 for common rotation in the rotational direction 20 in the operating position 57.

Figure 5:
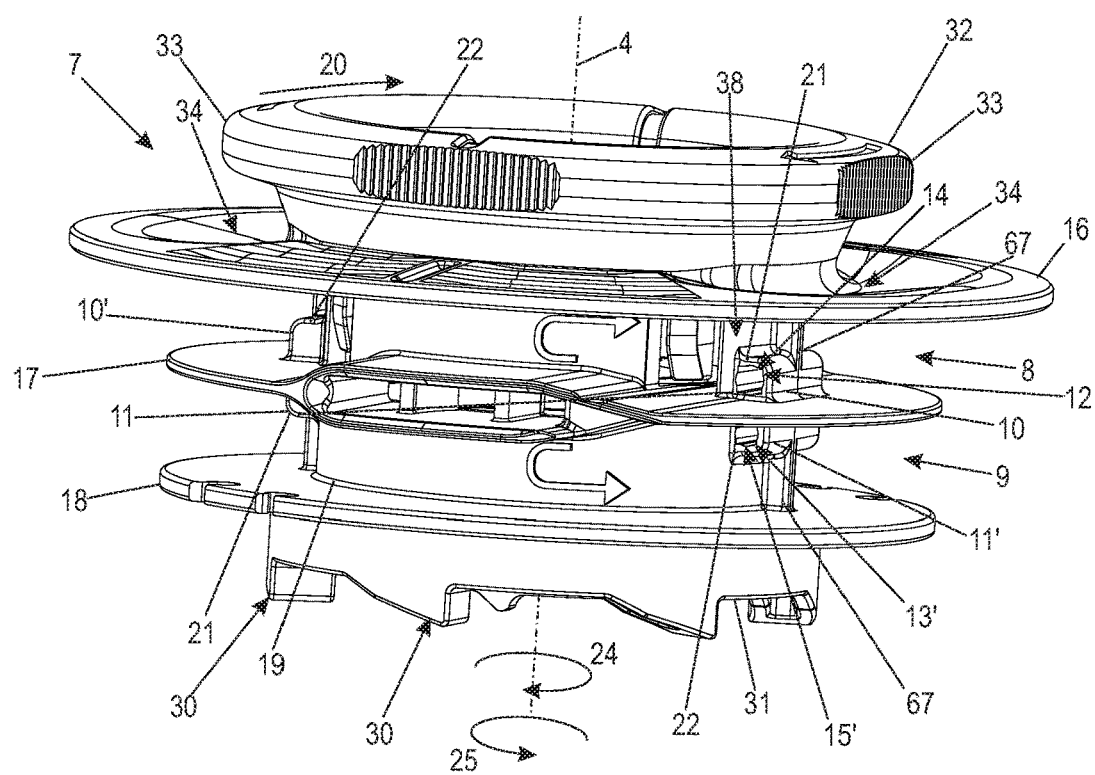
FIG. 5 is a perspective illustration of the trimmer line spool according to the invention.

As shown in FIGS. 4 and 5, the trimmer line spool 7 comprises a first spool chamber 8 and a second spool chamber 9. The first spool chamber 8 is the chamber in which a first trimmer line 6 can be wound. The second spool chamber 9 is the chamber in which a second trimmer line 6' can be wound. The trimmer line spool 7 comprises a first spool wall 16, a second spool wall 18, and an intermediate wall 17 arranged between the first spool wall 16 and the second spool wall 18. The trimmer line spool 7 comprises moreover a circumferential wall 19 that connects the first spool wall 16, the intermediate wall 17, and the second spool wall 18 to each other. The first spool chamber 8 is delimited in the direction of the axis of rotation 4 by the first spool wall 16 and the intermediate wall 17. In radial direction relative to the axis of rotation 4, the first spool chamber 8 is delimited by the circumferential wall 19. The second spool chamber 9 is delimited in the direction of the axis of rotation 4 by the intermediate wall 17 and the second spool wall 18. In radial direction relative to the axis of rotation 4, the second spool chamber 9 is delimited by the circumferential wall 19. In an alternative embodiment, it can be advantageous to configure the intermediate wall 17 only in sections, in particular in the region of the inlet opening 36 and the outlet opening 37 of the trimmer line channel 35. In a further alternative embodiment, it can also be advantageous to provide no intermediate wall 17. In this way, the first spool chamber 8 and the second spool chamber 9 are connected partially, respectively, completely with each other. At the circumferential wall 19, a web 54 is formed which extends in radial direction relative to the axis of rotation 4 in the direction toward the axis of rotation 4 of the trimmer line spool 7 and connects the circumferential wall 19 to a hub 55 of the trimmer line spool 7. The trimmer line spool 7 is supported by means of its hub 55 at the pin 60 of the housing 44. A shoulder 56 with a stop contour structure 63 is formed at the hub 55 and serves for supporting the spring element 49. The trimmer line spool 7 is tensioned in the direction toward the cover 45 of the housing 44 by means of the spring element 49 resting against the shoulder 56 of the hub 55. In the operating position 57, the first spool wall 16 is contacting the end face of the circumferential wall 46 of the housing 44 which is facing away from the cover 45. In this way, the interior of the housing 44, which is formed by the cover 45 and the circumferential wall 46 and in which the trimmer line spool 7 is arranged, is closed off and protected against contamination.

As illustrated in FIGS. 4 and 5, the trimmer line spool 7 comprises an actuating device 32 for actuating the indexing device 30. The actuating device 32 is arranged adjoining the first spool wall 16 outside of the spool chambers 8, 9. In the preferred embodiment, the trimmer line spool 7 is embodied as one piece together with its actuation device 32. In the embodiment, the actuating device 32 comprises a holding projection 33 which is extending outwardly in radial direction relative to the axis of rotation 4 and is embodied for engagement from behind by an operator 26. The unwinding process of the trimmer line 6, 6' with actuation of the indexing device 30 will be explained briefly in the following.

When winding the trimmer line 6, 6' on the trimmer line spool 7, the trimmer line 6, 6' is wound opposite to the rotational direction 20 on the trimmer line spool 7. For unwinding the trimmer line 6, 6', the trimmer line spool 7 is to be rotated relative to the housing 44 in an unwinding direction 25 of the trimmer line spool 7 about the axis of rotation 4. In this context, the free end of the trimmer line 6, 6' projects out of the trimmer line openings 47 of the housing 44. The trimmer line 6, 6' is thus supported at the housing 44 upon unwinding so that the trimmer line portion of the trimmer line 6, 6' which is extending from the housing 44 becomes longer. The unwinding direction 25 of the trimmer line spool 7 is opposite to the rotational direction 20.

For unwinding the trimmer line 6, 6', the trimmer line spool 7 is to be pulled against the spring force exerted by the spring element 49 in the direction away from the housing 44 into an inoperative position. In this way, the form fit between contour structure 31 of the trimmer line spool 7 and the counter contour structure 50 of the housing 44 is canceled. In the preferred embodiment, the pulling force which is required for overcoming the spring force must be applied by the operator. For this purpose, the operator can grip the trimmer line spool 7 in a simple way at the holding projection 33 of the actuating device 32 and pull the trimmer line spool 7 away from the cover 45 of the housing 44. In this inoperative position, the trimmer line spool 7 is rotatable in the unwinding direction 25 opposite to the rotational direction 20 relative to the housing 44. Upon rotation of the trimmer line spool 7 in the unwinding direction 25, the trimmer line 6, 6' is unwound from the spool chambers 8, 9.

As illustrated in FIGS. 4 and 5, the holding projection 33 of the actuating device 32 forms together with the first spool wall 16 a grip groove 65 into which the operator can extend a hand and thus grip from behind the holding projection 33. The grip groove 65 is delimited by the first spool wall 16 in the direction of the axis of rotation 4 toward the trimmer line chambers 8, 9. The grip groove 65 is delimited by the holding projection 33 in the direction of the axis of rotation 4 away from the trimmer line chambers 8, 9. In order to provide for a better gripping of the holding projection 33, at least one grip depression 34 is provided in the first spool wall 16. In the preferred embodiment, two grip depressions 34 are provided. However, a different number of grip depressions 34 may be expedient. The grip depression 34 is embodied in the form of a curved portion in the first spool wall 16. Accordingly, the first spool wall 16 is of a curved configuration. The grip depression 34 which is formed in the first spool wall 16 extends in the direction toward the first spool chamber 8. The grip groove 65 comprises a width $d_1$ which is measured outside of the grip depression 34 in the direction of the axis of rotation 4 and which corresponds to the distance between the first spool wall 16 and the holding projection 33. In addition, the grip groove 65 comprises a maximum width $d_2$ which is measured inside the grip depression 34 in the direction of the axis of rotation 4 and corresponds to the maximum distance between the grip depression 34 and the holding projection 33. The maximum width $d_2$ of the grip groove 65 amounts to at least 120%, in particular at least 130%, of the width $d_1$ of the grip groove 65. As illustrated in FIG. 9, the grip depression 34 extends about the axis of rotation 4 at an angle distance of at least 40°, in particular of at least 60°, preferably approximately of 90°. By means of the partial increase of the width of the grip groove 65 at the grip depression 34, there is sufficient room provided in order to be able to grip from behind the hold projection 33 of the actuating device 32 in a simple way.

Figure 6:
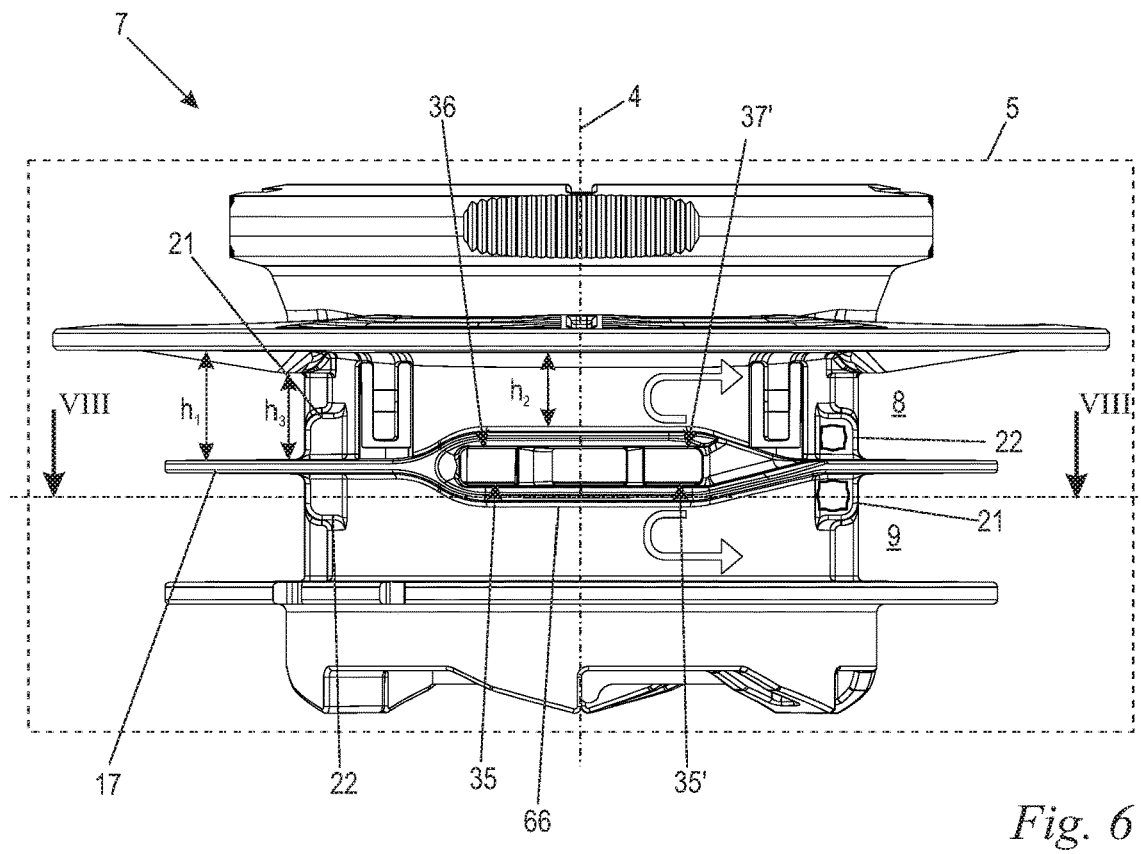
FIG. 6 is a side view of the trimmer line spool according to FIG. 5 showing the rear in relation to FIG. 5.

As illustrated in FIGS. 5 and 6, the trimmer line spool 7 comprises at least one continuous trimmer line channel 35. The trimmer line 6, 6' can be completely pushed all the way through the trimmer line channel 35 and wound onto the trimmer line spool 7. In the preferred embodiment, the trimmer line spool 7 has two continuous trimmer line channels 35, 35'. The continuous trimmer line channel 35 extends at least partially in the intermediate wall 17. The trimmer line channel 35, 35' comprises an inlet opening 36 and an outlet opening 37. The inlet opening 36 and the outlet opening 37 of a trimmer line channel 35, 35' comprise an angle distance β measured about the axis of rotation 4 of preferably 150° to 210°, in particular of 160° to 200°. The inlet opening 36 and the outlet opening 37 of the trimmer line channel 35, 35' are arranged in the intermediate wall 17. The inlet opening 36, the outlet opening 37, and the trimmer line channel 35 cause a locally thickened portion 66 of the intermediate wall 17. As illustrated in FIG. 6, the first spool chamber 8 has a first height $h_1$ which corresponds to the distance measured outside of the grip depression 34 and outside of the thickened portion 66 in the direction of the axis of rotation 4 between the first spool wall 16 and the intermediate wall 17. In addition, the first spool chamber 8 has a second height $h_2$ which corresponds to the distance measured between the first spool wall 16 and the intermediate wall 17 in the direction of the axis of rotation 4 at the thickened portion 66. The first spool chamber 8 comprises in the region of the grip depression 34 a reduced third height $h_3$ measured in the direction of the axis of rotation 4. The third height $h_3$ corresponds to the distance between the first spool wall 16 at the grip depression 34 and the intermediate wall 17. The third height $h_3$ is less than the first height $h_1$. The first height $h_1$ of the first spool chamber 8 is larger than the second height $h_2$ of the first spool chamber 8. In order to avoid an additional constriction of the first spool chamber 8 at the thickened portion 66, the at least one grip depression 34 is arranged displaced relative to the thickened portion 66 in the circumferential direction about the axis of rotation 4. Accordingly, the at least one grip depression 34 is arranged in a circumferential region 38 of the trimmer line spool 7 wherein the circumferential region 38 is positioned between the inlet opening 36 and the outlet opening 37 of the trimmer line channel 35, 35'. Accordingly, an additional constriction of the first spool chamber 8 at the thickened portion 66 of the intermediate wall 17 can be avoided. Due to the arrangement of the thickened portion 66 and the grip depression 34 displaced relative to each other in circumferential direction about the axis of rotation 4, sufficient space for winding the trimmer line 6, 6' can be provided along the entire first spool chamber 8.

As illustrated in FIG. 5, the trimmer line spool 7 has two holder pairs 21, 22. The first holder pair 21 of the two holder pairs 21, 22 comprises a first trimmer line holder 10 correlated with the first spool chamber 8 and a second trimmer line holder 11 which is correlated with the second spool chamber 9. The second holder pair 22 of the two holder pairs 21, 22 comprises also a first trimmer line holder 10' correlated with the first spool chamber 8 and a second trimmer line holder 11' correlated with the second spool chamber 9. Each trimmer line holder 10, 10', 11, 11' comprises an opening 14, 14', 15, 15' for receiving a trimmer line end. The trimmer line 6, 6' is fixed with its trimmer line end in the trimmer line holder 10, 10', 11, 11' and subsequently wound onto the trimmer line spool 7. This process will be explained later on in more detail.

As illustrated in FIGS. 4 and 5, the trimmer line holders 10, 10', 11, 11' are formed at the circumferential wall 19 of the trimmer line spool 7. Accordingly, the trimmer line holders 10, 10', 11, 11' are arranged as close as possible to the axis of rotation 4 in order to obtain an inertia moment as small as possible of the trimmer line spool 7. The first trimmer line holders 10, 10' of the holder pairs 21, 22 are arranged in the first spool chamber 8. The first trimmer line holders 10, 10', are positioned in this context at the intermediate wall 17, i.e., at the side of the intermediate wall 17 opposite the first spool wall 16. The second trimmer line holders 11, 11' of the holder pairs 21, 22 are arranged in the second spool chamber 9. The second trimmer line holders 11, 11' are positioned in this context at the intermediate wall 17, i.e., at the side of the intermediate wall 17 positioned opposite the second spool wall 18. In the preferred embodiment, the first trimmer line holders 10, 10' of one holder pair and the second trimmer line holder 11, 11' of the other holder pair are positioned opposite each other relative to the intermediate wall 17, in particular mirror-symmetrical thereto. The inlet opening 36 and the outlet opening 37 of the continuous trimmer line channel 35, 35' are arranged in circumferential direction centrally between two trimmer line holders 10, 10', 11, 11' of a holder pair 21, 22.

Figure 7:
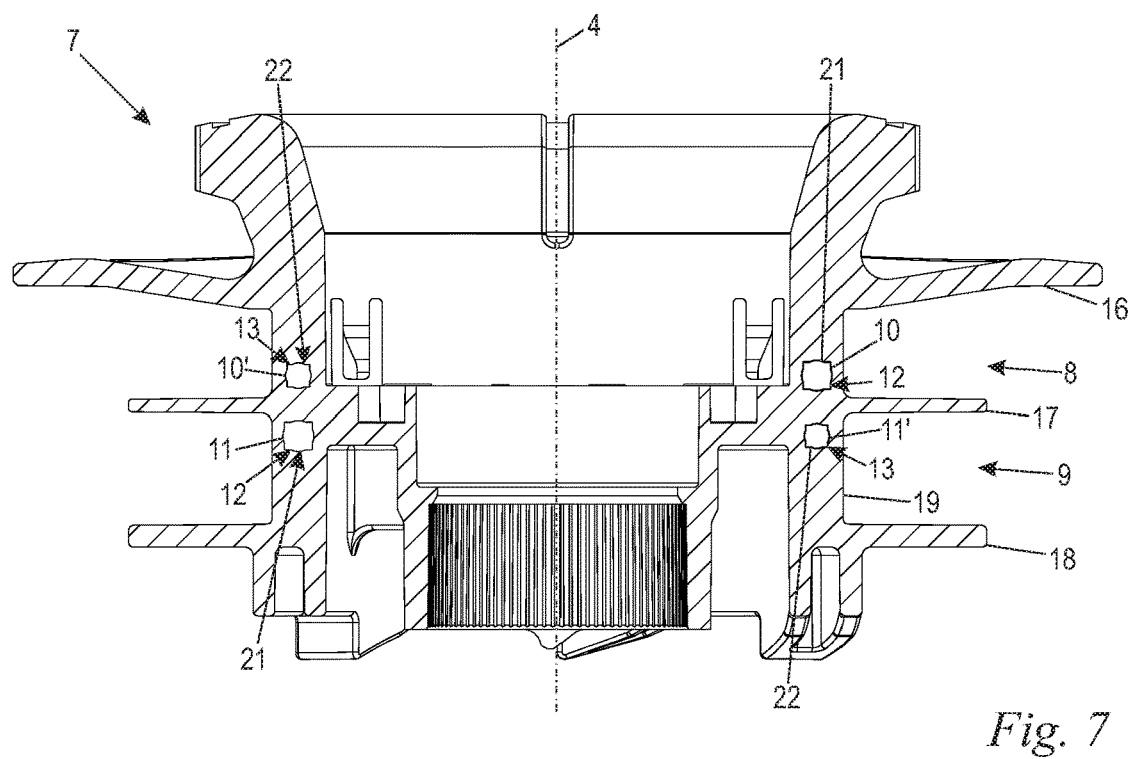
FIG. 7 is a lateral section illustration of the trimmer line spool of FIG. 5 through the trimmer line holders.
Figure 8:
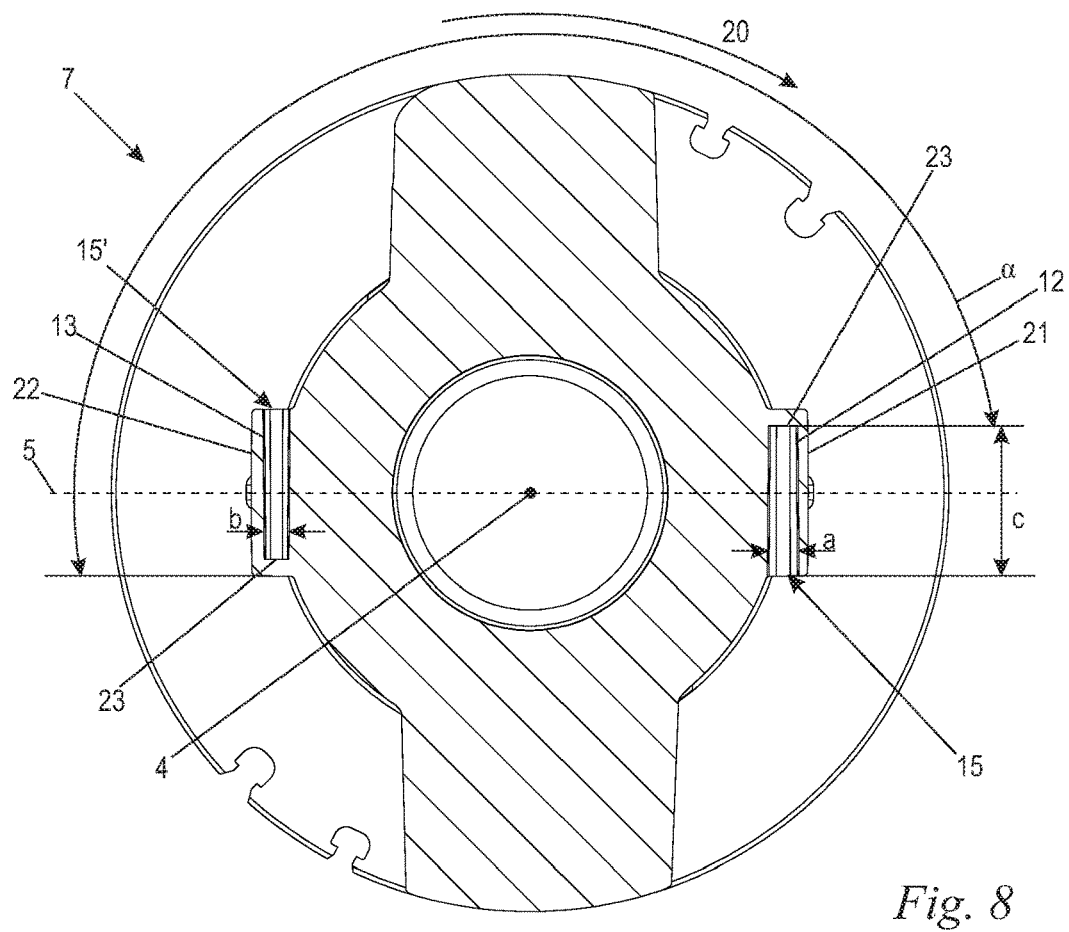
FIG. 8 is a section illustration of the trimmer line spool in the direction of arrows VIII according to FIG. 6.

As shown in FIGS. 7 and 8, the diameter a of the openings 14, 15 of the trimmer line holders 10, 11 of the first holder pair 21 are larger than the diameter b of the openings 14', 15' of the trimmer line holders 10', 11' of the second holder pair 22. The diameter b of the opening 14', 15' of the trimmer line holder 10', 11' of the second holder pair 22 amounts to at most 90% of the diameter a of the opening 14, 15 of the trimmer line holder 10, 11 of the first holder pair 21. The diameter b of the openings 14', 15' of the trimmer line holders 10', 11' of the second holder pair 22 amounts to at least 60% of the diameter a of the openings 14, 15 of the trimmer line holders 10, 11 of the first holder pair 21. The different diameters a, b of the openings 14, 14', 15, 15' of the holder pairs 21, 22 enable the use of trimmer lines 6, 6' with different diameters. Thus, the holder pair 21 with the trimmer line holders 10, 11 with larger diameter a of the openings 14, 15 can hold trimmer lines 6, 6' with large diameter; the holder pair 22 with the trimmer line holders 10', 11' with small diameter b of the openings 14', 15' can hold trimmer lines 6, 6' with small diameter.

As illustrated in FIG. 8, the openings 14, 15 of the trimmer line holders 10, 11 of the holder pair 21 and the openings 14', 15' of the trimmer line holders 10', 11' of the holder pair 22 have an angle distance α, measured about the axis of rotation 4, of 150° to 210°, in particular of 160° to 200°, approximately of 180°, relative to each other, respectively. In the preferred embodiment, the trimmer line holders 10, 10', 11, 11' of at least one holder pair 21, 22 are positioned at least partially in the longitudinal plane 5 containing the axis of rotation 4. Due to the displaced arrangement of the first trimmer line holder 10, 11 and of the second trimmer line holder 10', 11' of the respective holder pairs 21, 22 in the circumferential direction of the axis of rotation 4, the ends of the trimmer lines 6, 6' are also clamped displaced about the corresponding angle distance relative to each other in the trimmer line holders 10, 10', 11, 11'. The trimmer line openings 47 at the housing 44 have an angle distance of approximately 180°. The trimmer lines therefore exit displaced at an angle distance of approximately 180° relative to each other from the housing 44.

Due to the displaced trimmer line holders 10, 10', 11, 11' and the displaced trimmer line openings 47, a symmetrical winding of the trimmer lines 6, 6' can be realized and thus also a uniform mass distribution in relation to the axis of rotation 4. Therefore, the centrifugal forces acting on the trimmer line 6, 6' in operation of the trimmer head 3 cancel each other mutually. In this way, imbalance of the trimmer line spool 7 and thus also of the trimmer head 3 are avoided.

As illustrated in particular in FIG. 7, the trimmer line holders 10, 10', 11, 11' of at least one holder pair 21, 22 are formed of identical trimmer line chambers 12, 13. The trimmer line chambers 12, 13 are accessible through openings 14, 14', 15, 15' of the trimmer line holder 10, 10', 11, 11'. In this context, the opening 14, 14', 15, 15' is formed at the leading end of the trimmer line chamber 12, 13 viewed in the rotational direction 20. At the rearward side of the trimmer line chamber 12, 13 viewed in rotational direction 20, a stop 23 for the trimmer line end is formed. For clamping the trimmer line 6, 6' in the trimmer line holder 10, 10', 11, 11', the trimmer line 6 can be inserted via the opening 14, 14', 15, 15' of the trimmer line holder 10, 10', 11, 11' into the trimmer line chamber 12, 13 and can be pushed all the way against the stop 23 into the trimmer line holder 10, 10', 11, 11'. In the preferred embodiment, the trimmer line 6, 6' can be inserted only via the opening 14, 14', 15, 15' of the trimmer line holder 10, 10', 11, 11' into the trimmer line chamber 12, 13. It can be provided that at the trailing side of the trimmer line chamber 12, 13 viewed in rotational direction 20, a further opening is provided which serves only for cleaning the trimmer line holder. In this context, the diameter of this opening is designed to be so small that the trimmer line 6, 6' stops however at the stop 23 in any case. Pushing the trimmer line 6, 6' through the opening provided at the stop 23 is not possible. In the preferred embodiment of the trimmer line spool 7, as illustrated in FIG. 8, the trimmer line chamber 12, 13 is closed at the side which is positioned opposite the opening 14, 14' 15, 15', i.e., is closed at the stop 23.

In the preferred embodiment as illustrated in FIG. 5, between the first trimmer line holders 10, 10' and the first spool wall 16 as well as between the second trimmer line holders 11, 11' and the second spool wall 18, a reinforcement rib 67 is provided at the circumferential wall 19, respectively. The trimmer lines 6, 6' are laid about the reinforcement ribs 67 when wound on the trimmer line spool 7. The forces which are acting through the trimmer line 6, 6' onto the trimmer line spool 7 are distributed in a mechanically favorable manner by the reinforcement ribs 67 to the circumferential wall 19 so that peak loads at the circumferential wall 19 of the trimmer line spool 7 are avoided.

Figure 11:
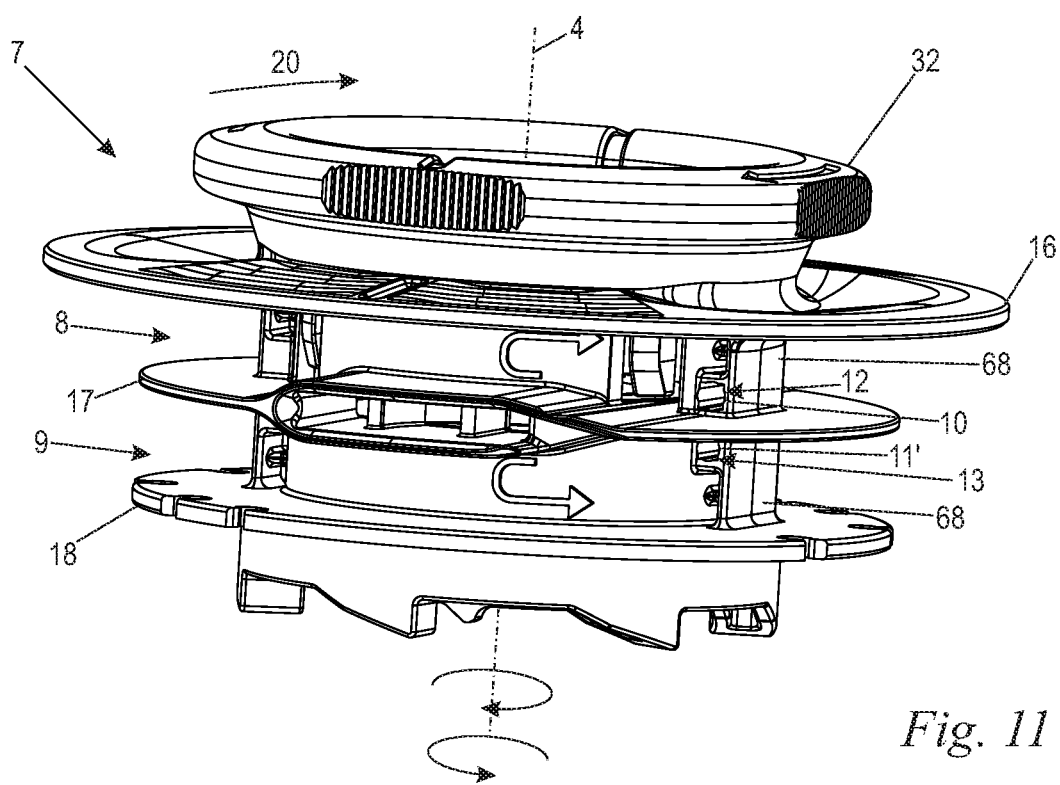
FIG. 11 is a perspective illustration of an alternative embodiment of the trimmer line spool.

In an alternative embodiment of the trimmer line spool 7 according to the invention in accordance with FIG. 11, a reinforcement wall 68 can be provided instead of the reinforcement ribs 67. The reinforcement wall 68 extends in the direction of the axis of rotation 4, beginning at the first trimmer line holder 10, 10', all the way to the first spool wall 16. In this context, the reinforcement wall 68 is part of the trimmer line holder 10, 10' so that the reinforcement wall 68 extends completely from the intermediate wall 17 to the first spool wall 16. In the same embodiment, a further reinforcement wall 68 is provided extending in the direction of the axis of rotation 4, beginning at the second trimmer line holder 11, 11', all the way to the first spool wall 18. Preferably, the reinforcement wall 68 extends across the entire length c of the trimmer line chamber 12, 13 (see FIG. 8).

The operator can choose between two possibilities for winding the trimmer line 6, 6' on the trimmer line spool 7. When the trimmer head 3 is demounted, the operator can insert the first trimmer line 6 into the first trimmer line holder 10, 10' of a holder pair 21, 22 and the second trimmer line 6' into the second trimmer line holder 11, 11' of the same holder pair 21, 22. Subsequently, the trimmer line spool 7 is to be rotated in a winding direction 24 that is opposite to the unwinding direction 25. The trimmer lines 6, 6' are to be held by hand such that they are wound onto the trimmer line spool 7. In this context, the trimmer lines 6, 6' bend beginning at the trimmer line holders 10, 10', 11, 11' by approximately 180° so that the trimmer line ends are held by being clamped in the trimmer line holders 10, 10', 11, 11'. Subsequently, the trimmer line spool 7 with the trimmer lines 6, 6' wound into the first spool chamber 8 and into the second spool chamber 9 is to be positioned in the trimmer head 3 so that the free ends of the trimmer lines 6, 6' project out of the trimmer line openings 47 of the housing 44 of the trimmer head 3.

When the operator does not want to remove the trimmer head 3 from the trimmer, the operator can insert a trimmer line 6, 6' from the exterior through the trimmer line channel 35, 35' and subsequently can rotate the trimmer line spool 7 in the winding direction 24 relative to the housing 44. In this context, the trimmer line spool 7 runs across the back surfaces 53 of the ramps 51 at the counter contour structure 50 and moves in the direction of the axis of rotation 4 against the spring force of the spring element 49 away from the housing 44 until the ramp 51 locks in the corresponding counter contour structure 50. Applying a pulling force on the actuation device 32, as it is required for unwinding the trimmer line, is not required. It is sufficient to rotate the trimmer line spool 7 in the winding direction 24 relative to the housing 44 because the shape of the ramps 51 automatically leads to overcoming the geometry of the counter contour structure 50. Such functional principles are also known from pawl devices. Thus, the trimmer line channel 35, 35' provides an alternative fastening possibility in relation to the trimmer line holders 10, 10', 11, 11' for fastening the trimmer line 6, 6' in the spool chambers 8, 9.

Figure 10:
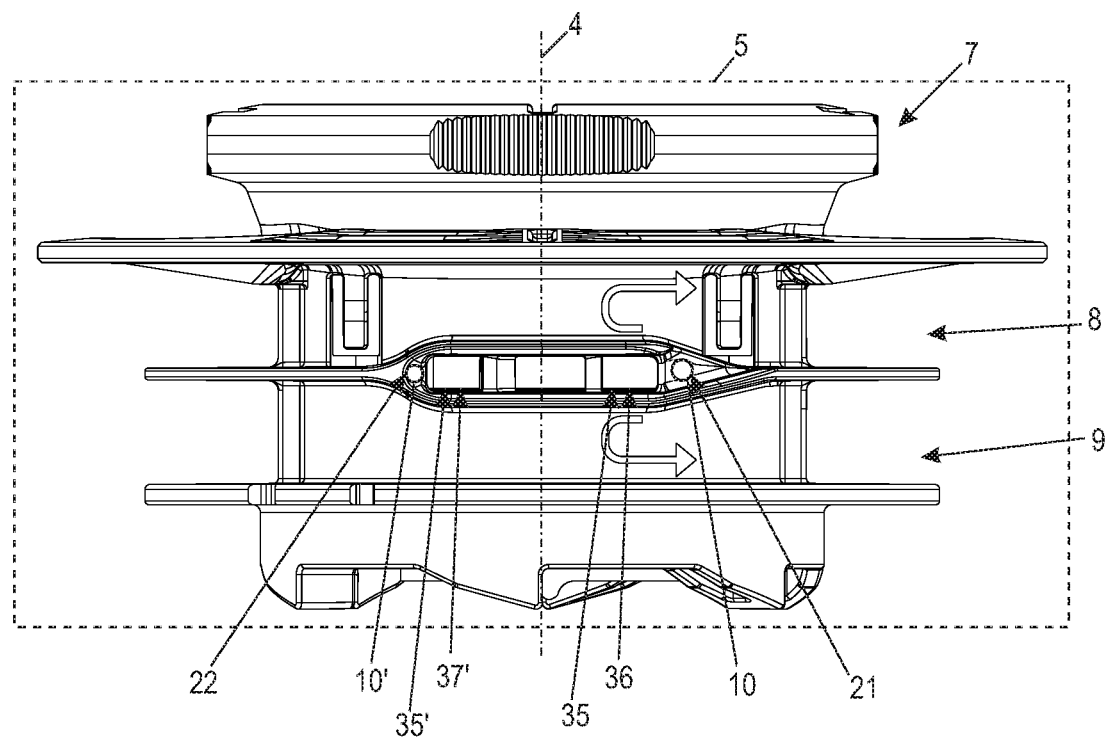
FIG. 10 is a side view of an alternative embodiment of the trimmer line spool.

In FIG. 10, a further trimmer line spool 7 according to the invention is illustrated which differs from the embodiment of FIG. 5 only in the arrangement of the trimmer line holders 10, 10', 11, 11'. The trimmer line holders 10, 10', 11, 11' are arranged in the intermediate wall 17 of the trimmer line spool 7. In this context, the first trimmer line holders 10, 10' are arranged adjacent to the inlet opening 36 of the trimmer line channel 35 and the second trimmer line holders 11, 11' adjacent to the outlet opening 37 of the trimmer line channel 35. Preferably, the trimmer line holders 10, 10', 11, 11' are arranged relative to each other such that the trimmer line holders 10, 11 of the first holder pair 21 are embodied with axial symmetry relative to the axis of rotation 4 and the trimmer line holders 10', 11' of the second holder pair 22 are also embodied with axial symmetry to the axis of rotation 4. The longitudinal direction of the trimmer line holder 10, 10', 11, 11' intercepts in this context the circumferential wall 19. This results in the same functional operation in accordance with the invention and the same advantages for the trimmer line spool 7 according to FIG. 10 as disclosed for the trimmer line spool 7 according to FIG. 5.

The specification incorporates by reference the entire disclosure of European priority document 19 213 583.8 having a filing date of Dec. 4, 2019.

While specific embodiments of the invention have been shown and described in detail to illustrate the inventive principles, it will be understood that the invention may be embodied otherwise without departing such principles.

What is claimed is:

1. A trimmer line spool for a trimmer head, the trimmer line spool comprising:
    a first spool chamber and a second spool chamber, wherein the first spool chamber is configured to wind a free end of a first trimmer line therein in a winding direction about an axis of rotation of the trimmer line spool and wherein the second spool chamber is configured to wind a free end of a second trimmer line therein in the winding direction about the axis of rotation of the trimmer line spool, wherein, upon rotation of the trimmer line spool in an unwinding direction, the first trimmer line is unwound from the first spool chamber and the second trimmer line is unwound from the second spool chamber;

a first holder pair;
a second holder pair;
wherein the first holder pair comprises a first trimmer line holder associated with the first spool chamber and further comprises a second trimmer line holder associated with the second spool chamber;
wherein the second holder pair comprises a first trimmer line holder associated with the first spool chamber and further comprises a second trimmer line holder associated with the second spool chamber;
wherein the first trimmer line holder of the first holder pair and the first trimmer line holder of the second holder pair are arranged in the first spool chamber;
wherein the second trimmer line holder of the first holder pair and the second trimmer line holder of the second holder pair are arranged in the second spool chamber;
wherein the first and second trimmer line holders of the first holder pair each comprise a first opening for receiving the trimmer line;
wherein the first and second trimmer line holders of the second holder pair each comprise a second opening for receiving the trimmer line;
wherein a diameter of the first openings is larger than a diameter of the second openings;
wherein the first openings are positioned at an angle distance of 150° to 210° measured around the axis of rotation relative to each other;
wherein the second openings are positioned at an angle distance of 150° to 210° measured around the axis of rotation relative to each other;
a first spool wall, a second spool wall, and an intermediate wall positioned between the first spool wall and the second spool wall;
a circumferential wall, wherein the first spool wall, the second spool wall, and the intermediate wall are connected to each other by the circumferential wall, wherein the circumferential wall extends in a direction of the axis of rotation of the trimmer line spool;
wherein the first and second trimmer line holders of the first holder pair and the first and second trimmer line holders of the second holder pair are resting against the intermediate wall in the direction of the axis of rotation;
wherein the first trimmer line holder of the first holder pair and the second trimmer line holder of the second holder pair are positioned mirror-symmetrical to each other in relation to a mirror plane which is a radial plane of the intermediate wall.

2. The trimmer line spool according to claim 1, wherein the first and second trimmer line holders at least of one of the first and second holder pairs are positioned at least partially in a longitudinal plane of the trimmer line spool containing the axis of rotation.

3. The trimmer line spool according to claim 1, wherein the first and second trimmer line holders at least of one of the first and second holder pairs are comprised of identical trimmer line chambers.

4. The trimmer line spool according to claim 3, wherein the trimmer line is insertable into the trimmer line chambers only through the first openings or the second openings, respectively.

5. The trimmer line spool according to claim 3, wherein the trimmer line chambers are closed at a side opposite the first opening or the second opening, respectively, and the side that is closed forms a stop for the trimmer line.

6. The trimmer line spool according to claim 3, wherein the trimmer line spool comprises a rotational direction, wherein the rotational direction is the winding direction, and wherein the first openings of the first and second trimmer line holders of the first holder pair are formed at a leading side of the trimmer line chambers, wherein the leading side is leading when viewed in the rotational direction.

7. The trimmer line spool according to claim 3, wherein the trimmer line spool comprises a rotational direction, wherein the rotational direction is the winding direction, and wherein the second openings of the first and second trimmer line holders of the second holder pair are formed at a leading side of the trimmer line chambers, wherein the leading side is leading when viewed in the rotational direction.

8. The trimmer line spool according to claim 1, wherein the diameter of the second openings amounts to at most 90% of the diameter of the first openings.

9. The trimmer line spool according to claim 1, further comprising a contour structure for an indexing device arranged at an end face of the trimmer line spool.

10. The trimmer line spool according to claim 1, wherein the trimmer line spool comprises at least one continuous trimmer line channel configured to allow the trimmer line to be pushed therethrough and wound onto the trimmer line spool.

11. The trimmer line spool according to claim 10, wherein the at least one continuous trimmer line channel comprises an inlet opening and an outlet opening, wherein the inlet opening and the outlet opening, viewed in a circumferential direction of the trimmer line spool, are arranged centrally between the first and the second trimmer line holders of one of the first and second holder pairs.

12. The trimmer line spool according to claim 11, wherein the inlet opening and the outlet opening of the at least one continuous trimmer line channel are arranged in an intermediate wall of the trimmer line spool.

13. The trimmer line spool according to claim 1,
wherein the first spool chamber is delimited by the first spool wall and the intermediate wall in an axial direction along the axis of rotation, and wherein the second spool chamber is delimited by the intermediate wall and the second spool wall in the axial direction along the axis of rotation;
wherein the first trimmer line holder of the first holder pair is arranged in the first spool chamber above the intermediate wall, and wherein the second trimmer line holder of the first holder pair is arranged in the second spool chamber below the intermediate wall;
wherein the first trimmer line holder of the second holder pair is arranged in the first spool chamber above the intermediate wall, and wherein the second trimmer line holder of the second holder pair is arranged in the second spool chamber below the intermediate wall;
wherein the first opening of the first trimmer line holder of the first holder pair is arranged in the first spool chamber and extends exclusively above the intermediate wall, and wherein the first opening of the second trimmer line holder of the first holder pair is arranged in the second spool chamber and extends exclusively below the intermediate wall;
wherein the second opening of the first trimmer line holder of the second holder pair is arranged in the first spool chamber and extends exclusively above the intermediate wall, and wherein the second opening of the second trimmer line holder of the second holder pair is arranged in the second spool chamber and extends exclusively below the intermediate wall;
wherein the first openings and the second openings are spaced apart from the intermediate wall.

14. The trimmer line spool according to claim 1,
wherein the circumferential wall is arranged coaxially to the axis of rotation of the trimmer line spool;
wherein the intermediate wall is fixedly connected to the circumferential wall and extends away from the circumferential wall in a radial direction in relation to the axis of rotation of the trimmer line spool;
wherein the first holder pair and the second holder pair each are arranged immediately at the circumferential wall and arranged immediately at the intermediate wall.

15. The trimmer line spool according to claim 1,
wherein the intermediate wall separates the first spool chamber and the second spool chamber from each other, wherein the radial plane is oriented perpendicularly in relation to the axis of rotation of the trimmer line spool and extends through the intermediate wall;
wherein the first trimmer line holder of the first holder pair and the second trimmer line holder of the first holder pair are arranged diagonally opposite each other in relation to the radial plane;
wherein the first trimmer line holder of the second holder pair and the second trimmer line holder of the second holder pair are arranged diagonally opposite each other in relation to the radial plane.

\* \* \* \* \*